United States Patent [19]
Gumley

[11] Patent Number: 5,995,352
[45] Date of Patent: *Nov. 30, 1999

[54] IGNITION APPARATUS AND METHOD

[75] Inventor: John Richard Gumley, Kettering, Australia

[73] Assignee: Erico Lightning Technologies Pty. Ltd., Tasmania, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/849,089

[22] PCT Filed: Nov. 17, 1995

[86] PCT No.: PCT/AU95/00768

§ 371 Date: May 28, 1997

§ 102(e) Date: May 28, 1997

[87] PCT Pub. No.: WO96/17419

PCT Pub. Date: Jun. 6, 1996

[30] Foreign Application Priority Data

Nov. 29, 1994 [AU] Australia ............................... PM9754
Feb. 13, 1995 [AU] Australia ............................... PN1082

[51] Int. Cl.$^6$ ....................................................... H02H 3/22
[52] U.S. Cl. ............................... 361/111; 361/56; 361/91; 361/118
[58] Field of Search .................................. 361/119, 120, 361/117, 118, 129–130, 137, 138, 56, 91, 111, 112

[56] References Cited

U.S. PATENT DOCUMENTS

| | | |
|---|---|---|
| 3,154,718 | 10/1964 | Yonkers et al. . |
| 3,626,237 | 12/1971 | Bolton et al. . |
| 3,657,594 | 4/1972 | Latal ........................................ 361/137 |
| 3,877,864 | 4/1975 | Carlson .................................... 431/264 |
| 4,112,330 | 9/1978 | Stimson et al. . |
| 4,187,524 | 2/1980 | Peterson ................................... 361/16 |
| 4,366,523 | 12/1982 | Hasse et al. . |
| 4,486,805 | 12/1984 | Cline . |
| 4,628,398 | 12/1986 | Cook ........................................ 361/120 |
| 4,631,453 | 12/1986 | DeSouza et al. ......................... 361/129 |
| 4,665,357 | 5/1987 | Herbert . |
| 4,683,514 | 7/1987 | Cook .......................................... 361/91 |
| 4,760,213 | 7/1988 | Gumley ........................................ 174/3 |
| 4,760,486 | 7/1988 | Beeken et al. ............................. 361/56 |
| 4,860,156 | 8/1989 | Stenstrom et al. ....................... 361/128 |
| 5,233,498 | 8/1993 | Kansala ................................... 361/130 |

FOREIGN PATENT DOCUMENTS

| | | |
|---|---|---|
| 2486726 | 1/1982 | France . |
| 2544923 | 10/1984 | France . |
| 2627648 | 12/1977 | Germany . |
| 4317191A1 | 11/1997 | Germany . |
| 1540844 | 2/1979 | United Kingdom . |
| 2166307 | 4/1986 | United Kingdom . |
| WO90/05399 | 5/1990 | WIPO . |
| WO9117556 | 11/1991 | WIPO . |
| WO9417578 | 8/1994 | WIPO . |
| WO9427350 | 11/1994 | WIPO . |

OTHER PUBLICATIONS

Derwent Abstract Accession No. J1154 D/35, class X13, SU,A,777771 (Kuzbass Poly) Nov. 7, 1980.

Derwent Abstract Accession No. B4247A/07, class R51,SU, A,502443 (Energosetproekt Ele) Jul. 26, 1977.

Derwent Abstract Accession No. 84–236382/38, class X13, SU,A,1069064 (Lukkonen V D) Jan. 23, 1984.

*Primary Examiner*—Michael J. Sherry
*Attorney, Agent, or Firm*—Renner, Otto, Boisselle & Sklar, P.L.L.

[57] ABSTRACT

The voltage across the spark gap is increased or amplified to ignite the gap when required, thus enabling ignition of the spark gap when required. The incremental voltage to obtain gap ignition is additive to any voltage already across the gap, and is additive irrespective of polarity. That is, if a possible overvoltage pulse arrives, the main gap has an increased positive voltage. If a negative overvoltage pulse arrives, the main gap has an increased negative voltage applied.

23 Claims, 3 Drawing Sheets

IGNITION APPARATUS AND METHOD

FIELD

The present application relates to the technology of igniting spark gaps, particularly lightning type arrestors. The application also relates to lightning protection and transient protection.

One invention relates particularly to an apparatus and method adapted to ignite the spark gap when line overvoltage is detected. Another invention relates to alleviating excess line voltage caused by transients or the passage of relatively high currents.

The present invention has application in many industries, particularly but not exclusively electrical transmission lines and telecommunications.

BACKGROUND

Spark gap type lightning arrestors have been used in order to protect electrical equipment. In operation they conduct excess line voltage delivered by lightning strikes to ground. The arrestors, by virtue of their configuration, have a spark gap which provided by an air gap dimensioned to not break down at system working voltages (line voltages), but to breakdown by arcing at an overvoltage well in excess of line voltage, such as an overvoltage consequential upon a lightning strike. The arc formed conducts the transient current, inherent in an overvoltage condition, to ground.

In order to ensure that the arc formed upon a lightning strike will extinguish after the overvoltage has been conducted to ground, the spark gap is dimensioned relatively wide. As a consequence, it typically requires approximately 3 kV to 4 kV across the gap to initiate the breakdown arc on a 220–240 V, 50 Hz system.

Thus, before the breakdown arc is initiated, a situation can arise where a line voltage of up to 4 kV is transmitted to equipment which is sensitive to such excess voltage. This problem has to date been left unaddressed.

Other arrestors incorporate a third electrode proximate one of the main electrodes. When activated, the third electrode creates a spark between it and one of the main electrodes. This spark forces the main gap between the main electrodes to avalanche. The problem in reducing the gap width is power follow-on current and formation of metal fingers from gasified metal. These can short circuit the gap. Also, the enormous temperatures (typically 5000°–8000° C.) and pressures in the triggered arc cause severe burning of the trigger electrode (with virtually whatever material is used). Further, these type of arrestors are specially constructed, relatively expensive, or have internal gas pressure reduced to control spark overvoltage.

Yet a further type of arrestor is the gas arrestor which has a spark gap encapsulated in a gas environment, the gas environment providing a relatively selected strike voltage. The gases typically used are neon, with a strike voltage of approximately 75V to 90V, and argon, with a strike voltage of approximately 230V. However, for example in the telecommunications industry there is a need for over voltage protection with a strike voltage of approximately 60V, and to date this need has also been unaddressed.

Other problems related to prior art devices is that where the arrestor is configured to a set trigger voltage, it has been found that after several operations, the trigger electrode can burn or deteriorate to such an extent that the original characteristics of break down voltage are partially or totally lost.

SUMMARY OF INVENTION

It is an object of the present invention to alleviate the problem of low voltage triggering of a spark gap type arrestor.

The present invention overcomes problems associated with the prior art by increasing the voltage across the spark gap.

This invention provides, in one form, an apparatus and method of initiating the firing of a spark gap, including:
a voltage means responsive to a trigger means, whereupon being triggered, the voltage means provides an additive voltage to the spark gap.

The present invention is predicated on the concept of increasing or amplifying the voltage across the spark gap in order to ignite the gap when required thus enabling ignition of the spark gap when required. The incremental voltage to obtain gap ignition is additive to any voltage already across the gap, and is additive irrespective of polarity. That is if a positive overvoltage pulse arrives, the main gap has an increased positive voltage. If a negative over-voltage pulse arrives, the main gap has an increased negative voltage applied.

In another form, there is provided an apparatus and method of triggering the firing of at least a two electrode spark gap device, including:
a voltage amplifier means adapted to increment or boost a trigger signal for application to and to fire the spark gap.

The principle of utilizing a means of amplifying the trigger voltage in order to ignite the spark gap can also be adopted in the present invention.

The voltage means is preferably embodied as a step-up transformer, but may also be provided in the form of a voltage source. In one form, the transformer is provided in series with the spark gap, the transformer having a toroidal winding.

The trigger means is preferably voltage sensitive in detecting an overvoltage line condition, and preferably can be set to trigger at any voltage level considered to be an overvoltage condition dependent on the application of the present invention. In one form, an avalanche device is used to pulse the voltage means.

The present apparatus and method is applicable to relatively low voltages and equally applicable to relatively high voltages. In this regard, the disclosure of the present invention with reference to a spark gap arrestor with a spark gap ignition voltage of 3 kV to 4 kV is only exemplary. The present invention can be implemented at trigger voltages well below 3 kV or well above 3 kV, dependent on the circuit and line conditions to which the present invention is applied. For example, if a 500V pulse arrives on the line, the present invention may add another 3 kV in series with the spark gap and cause the spark gap to trigger without the need for a third or other electrodes. In this example, 500V would be considered a line overvoltage and the present invention enables 3 kV plus 500V to be applied across the spark gap, causing the spark gap to fire at the line voltage of 500V, rather than 3 kV.

The present invention is also applicable to the firing of a standard spark gap at atmospheric pressure.

The invention disclosed seeks to artificially reduce the natural spark overvoltage by applying amplified, boosted and/or incremental voltages to the spark gap.

Preferred embodiments of the present inventions will now be disclosed.

Figure 1:
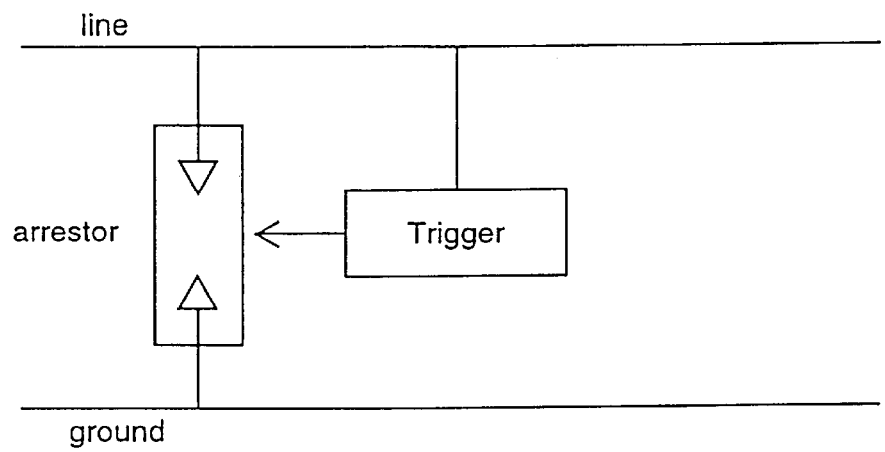
FIG. 1 is a diagram representing a basic principle utilized in accordance with the present invention.

FIG. 1 illustrates the basic principle utilised in the present invention. An arrestor is provided between line and ground rails in order to conduct overvoltage, i.e. excess voltage above the normal line voltage, to ground. By passing current to ground as a result of the arrestors operation, voltage sensitive equipment can be better protected.

A trigger mechanism external to the arrestor and incorporating the voltage means of the present invention can initiate the firing of the spark gap when an overvoltage condition is registered on the line.

The present invention can have one or more spark gaps to carry the full current. One gap is preferred, dependent on application. In respect of the triggering mechanism, it does not have to be a spark gap but it may be a second (tiggering) gap which is only for the pulse into the trigger transformer. It would therefore only carry a relatively small current. The triggering mechanism could otherwise be a sidactor or other solid state avalanche device. A gas arrestor is also another option.

For example, if the natural breakdown of the spark gap is 3000 volts, a trigger mechanism can be designed, for example to fire the spark gap when there is an applied pulse of 200 volts. A step up in this situation, a step up voltage of 15:1 transformer or other mechanism can be used to provide a voltage of 3000 volts across the spark gap. This 3000 volts in conjunction in series with the 200 volt line voltage applied would make a total of 3,200 volts. The spark gap would then fire having this voltage applied across it.

Figure 2:
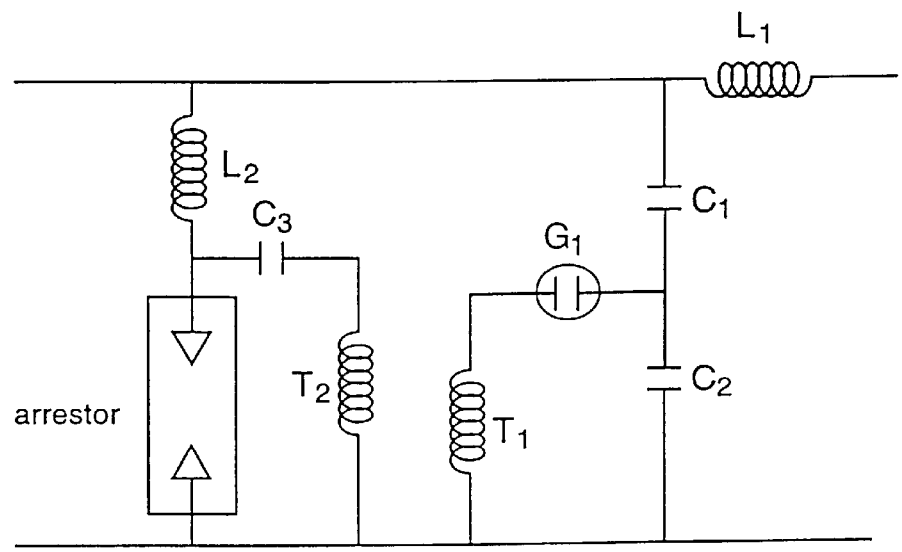
FIG. 2 is a diagram representing a first embodiment of the present invention.

One embodiment of the present invention is illustrated in FIG. 2. The line voltage appears across C1 and C2. G1 is a voltage sensitive trigger or any type of voltage sensitive switch device. In the form illustrated, G1 is a gas arrestor, but may be a triac or any other type of suitable avalanche device. The voltage provided at the junction of C1 and C2, when high enough as in an overvoltage condition, is used to cause the trigger G1 to fire. It can thus be seen that the values of C1 and C2 together with the characteristic of G1 can be selected appropriately to predetermine or selectively determine the line voltage considered to be overvoltage, and at which the spark gap is to fire. When the trigger G1 fires, the energy stored in C2 is dumped into T1.

T1 and T2 are an embodiment of the voltage means of the present invention. In this embodiment they are provided as a step-up transformer, although any form of voltage amplifier can be used, such as transistors or op-amps. It is the function of the voltage amplifier to increase or multiply the voltage provided by the trigger or line to a level sufficient to ignite the spark gap.

In the embodiment illustrated the spark gap ignition voltage is of the order of 3 to 4 kV. The amplifier means is thus configured to provide this voltage level as an ignition voltage to the spark gap when an overvoltage condition is registered.

If, for example, a line voltage of 400V or more is considered an overvoltage condition, a transformer ratio of 10:1 can be selected, together with appropriately rated trigger componentry to provide the necessary 4 kV spark gap ignition voltage. If, for example, the transformer winding ratio was 5:1, then again with appropriate componentry selected, a line voltage of 800V or more could then be considered an overvoltage condition.

The voltage appearing across T1, resultant from C2, is amplified in accordance with the transformer winding ratio and is delivered to the spark gap.

L2 is used as a choke to prevent the ignition voltage from being transmitted directly to the line. When the arrestor fires, however, L2 saturates to facilitate the flow of power from the line to ground.

C3 is used as a decoupling capacitor for the line 50 Hz.

L1 may be provided in isolation as a choke, or in conjunction with a capacitor to form an LC filter.

The spark gap arrestor may be a horn type or surface discharge type.

Another aspect of the present invention is that one or more components can be selected to set the level considered to be an overvoltage condition. The amplifier means, the voltage sensitive trigger and/or the capacitive ratios may be selected or designed to determine the flashover voltage considered an overvoltage.

Figure 3:
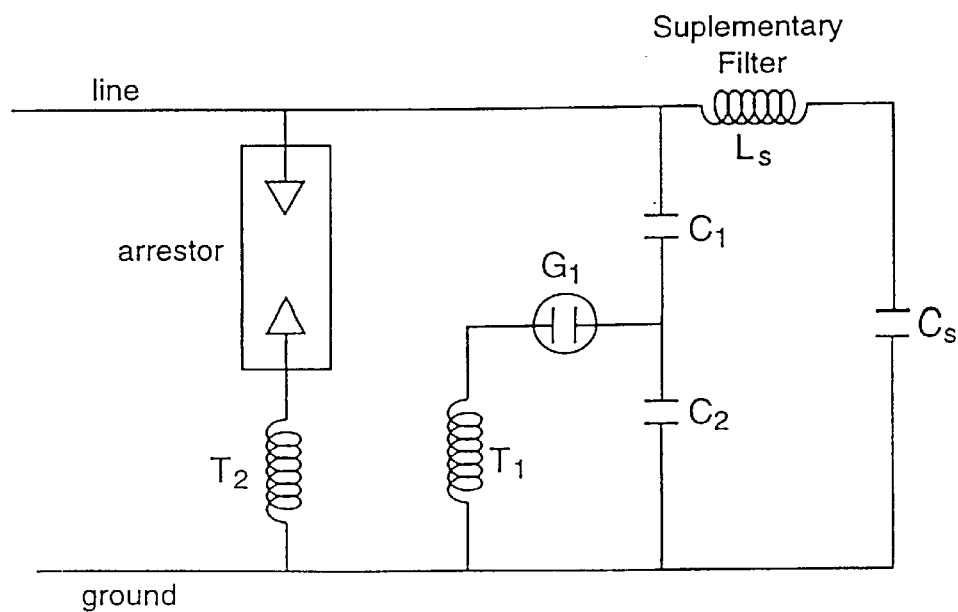
FIG. 3 is a diagram representing another embodiment of the invention.

FIG. 3 illustrates another embodiment of the present invention. The circuit illustrated works similar to that of FIG. 2, however in the embodiment of FIG. 2, the line voltage almost totally appeared across the spark gap and series inductors such as L2 were used to substantially prevent the ignition pulse back feeding to the line or power grid.

In FIG. 3, the amplifiers means is now coupled in series with the arrestor. To this end, the secondary winding T2 is coupled in series with the spark gap and between the line and ground rails. T2 is also polarized to add to the line transient voltage. In the embodiment illustrated, there is substantially no loading on the transformer until the spark gap fires. After firing, the core material of T2 will saturate and this will serves to reduce the series inductance observed by the impulse current.

Figure 4:
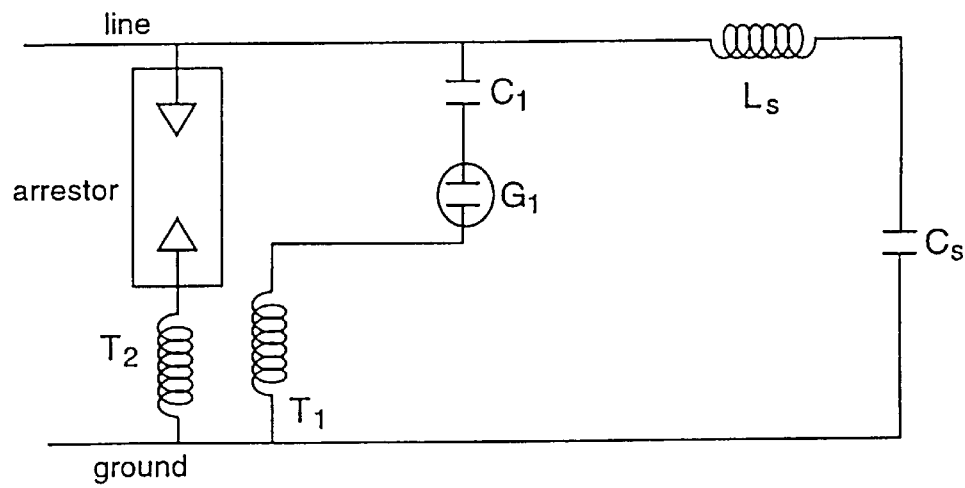
FIG. 4 illustrates an alternative embodiment to that of FIG. 3.

FIG. 4 illustrates an alternate to FIG. 3, and which operates in a similar fashion to the circuit of FIG. 3.

Figure 5:
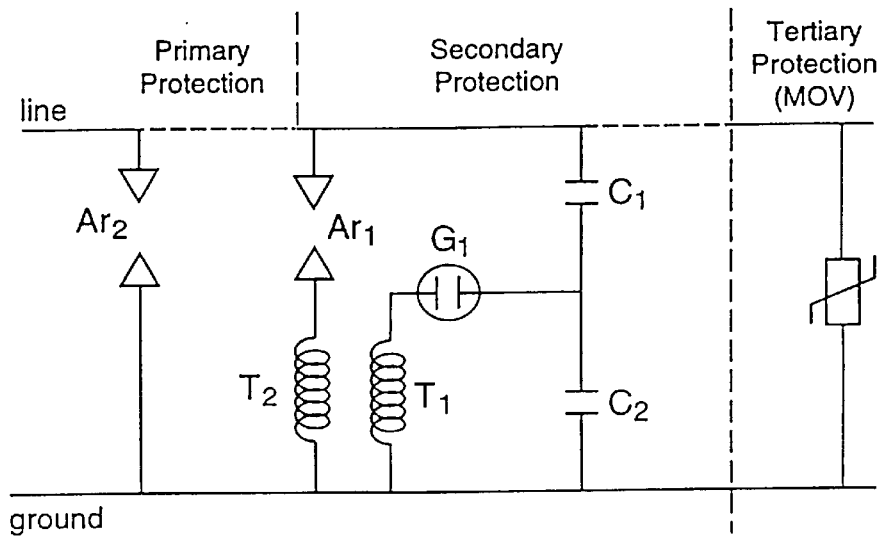
FIG. 5 represents still another embodiment of the invention.

In the embodiments disclosed in FIGS. 3, 4 and 5, the transformer secondary winding is in series with the main gap. The transformer secondary may be the actual trigger device, as it adds to the normal voltage to force spark over. Thus the transformer secondary can add to the applied line voltage to achieve gap firing.

In the embodiments illustrated is a unique way of triggering by adding voltage in series with the spark gap. This is resultant from the transformer being formed in a toroidal form, which when saturated produces a relatively low inductance. This factor is considered important in these embodiments since the main discharge current flows through these windings. Too much inductance, and the total residual voltage increases. Normal transformers have windings laying along side each other causing an enhanced magnetic field, even if the core saturates. If the north/south magnetic poles if each turn of a toroidal winding are considered, the north/south line rotates. Thus, if ten turns are used, the core field of each turn is 36° different in alignment to that of its neighbor. In this way, the residual inductance is reduced when the core is saturated. Minimising this residual inductance is an important aspect of using this type of embodiment.

This is due to the very high dI/dt of the lightning wavefront. Since the trigger transformer is in series with the gap and carries full discharge current, the voltage due to L dI/dt causes an increase in voltage reaching protected equipment. Values exceeding 5 $\mu$H would be considered excessive. Values of 1–1.5 $\mu$H can be achieved by the present invention.

Figure 6:
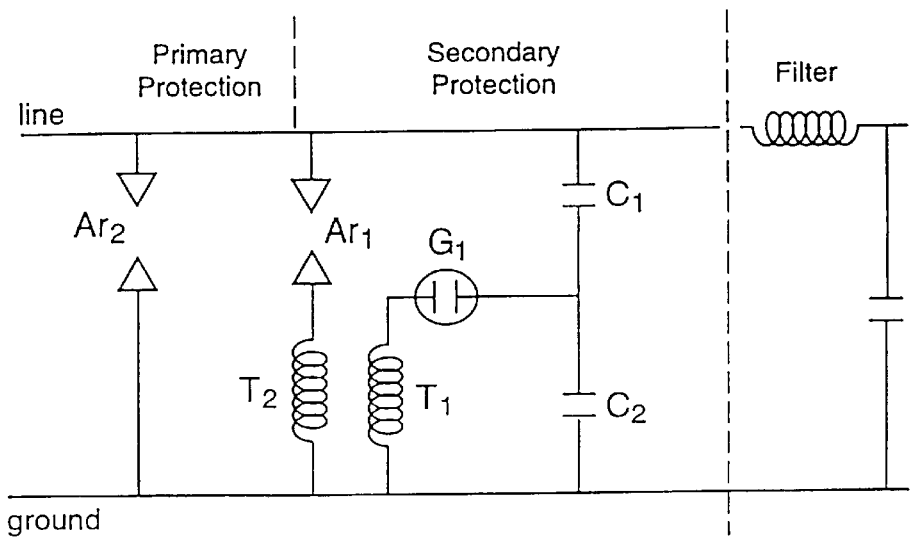
FIG. 6 illustrates yet another embodiment of the invention.

FIGS. 5 and 6 relate to the situation of a relatively high dI/dt in the circuit arrangement disclosed above.

The current passing through Ar1 and winding T2 may cause an increased voltage across line and ground rails. This has been found to occur due to the inductance of the winding T2, even when the core of the step-up transformer is saturated. For example, if the winding T2 in a saturated condition exhibits 4 $\mu$H, and dI/dt=1 kA/$\mu$sec, then V=L.(dI/dt)=4 kV.

It has been found that by providing a number of spark gap elements in circuit, each element being rated to conduct at a predetermined or selected voltage, the voltage caused by the relatively high dI/dt can be constrained to within allowable levels. In this way, one gap element may operate over a relatively low voltage window, and if the line voltage increases beyond that window, another gap element may operate over the next window, and so on. For example, Ar1 may be a smaller gap and may operate at 0.5 to 4 kV, and Ar2 may be a larger gap and may operate at voltages above 4 kV. Thus, in operation, element Ar1 will fire at a relatively low voltage given its relatively small gap, and element Ar2 can fire at a relatively high voltage given that it has a gap relatively larger than that of element Ar1. Element Ar2, when it fires, has been found to produce a limit on or modify the extent to which the line voltage extends into an overvoltage condition. A tertiary protector in the form of a metal oxide varistor may be provided downstream to further limit the residual voltage.

In the circuit arrangement as illustrated in FIG. 6, the residual voltage reaching the filter only exists for a few microseconds, and as such is relatively easy to filter out. The resultant voltage reaching the equipment to be protected may only be up to 20V or so above nominal line voltage. In this case, no tertiary protector is required.

Because of the use of the voltage amplifier of the present invention, and the many circuit parameters that can be chosen, the arrestor can be caused to fire over a range of voltages. This equally applies to the inventive aspect of providing a plurality of spark gap elements in circuit. The arrangements disclosed above have also been found to limit temporary overvoltages of the line, not just those resultant from a lightning strike, but where the line voltage nevertheless increases to and beyond a voltage level determined to be considered an overvoltage. For example, a temporary overvoltage on a power grid may increase the line voltage up to 3–4 times the rated voltage for up to 5 seconds. This type of line condition can also be dealt with by the present inventions, individually or in combination.

Spark gap arrestors can create "co-ordination" problems with other arrestors. For example, a spark gap may fire at 3.5 kV but an equipment supplier may have a 275 VRMS metal oxide varistor in his product. This varistor, by means of a low clamping voltage, may prevent operation of the spark gap. Consequently, the lightning energy is wholly transmitted to the equipment. In the present invention it is possible to modify the spark overvoltage and eliminate co-ordination problems.

Figure 7:
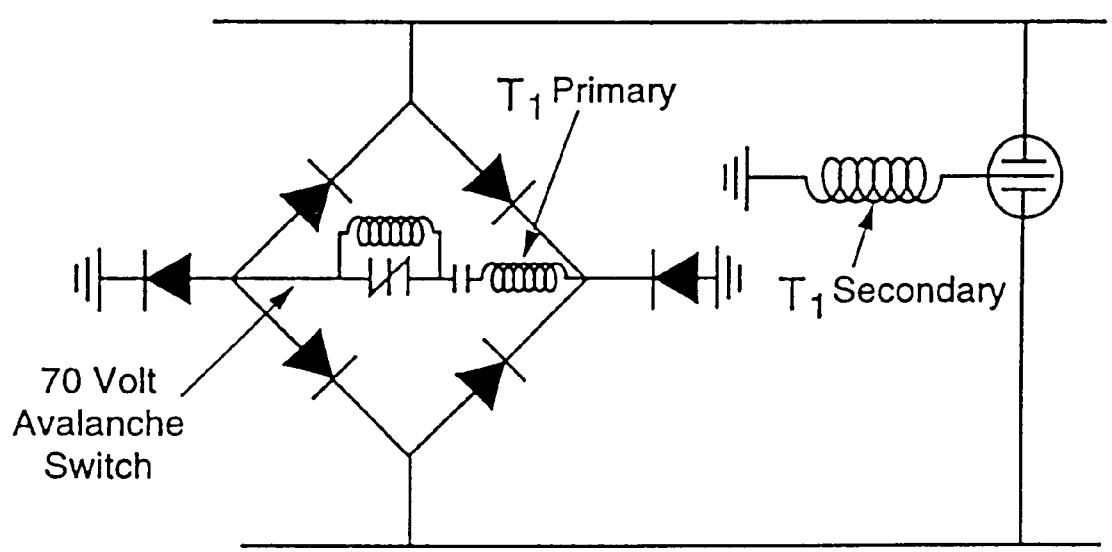
FIG. 7 illustrates a further embodiment of the invention.

An adaptation of the present invention or "incremental voltage triggering concept" is illustrated in FIG. 7 in its application to telecom lines. Using the circuit of FIG. 6, pulses of any polarity may arrive on one or both lines.

The bridge makes all pulses unipolar as they apply to the avalanche switch. In a preferred form, this will trigger at 70V and pass a pulse current through T1 primary. The secondary of T1 is in series with the earth of a three element gas arrestor. It is polarised to add to the line voltage.

Normally, gas arrestors are rated 230V as ring voltages and battery can raise working line voltages to around 190V. But, on sensitive circuits, such as PABX line cards, this is too much. This circuit will allow 200V to pass but force the arrestor to fire on fast transients. The R/C components around the avalanche switch preclude operation on low frequencies up to 200V. The T1 secondary uses core saturation to be effective.

The reason for using gas arrestors is that they can bypass high energy levels. However, the drawback with using existing gas arrestors is that they are preset to trigger at voltages such as 75, 90 or 230 volts or more. These said voltages are thus considered unsuitable for many applications, for example where a circuit must be designed to arrest strike voltage above 60 volts. The present invention, advantageously, can add 30 volts to an existing 60 volt line voltage in order to trigger a 90 volt gas arrestor or, on the other hand, can add 170 volts to an existing 60 volt line voltage to trigger a 230 volt gas arrestor. The circuit of the present invention, that is the voltage amplifier mechanism can suitably be configured depending on the application.

I claim:

1. An apparatus adapted to initiate the firing of a spark gap in response to a transient or overvoltage condition, the apparatus including voltage means for applying an additive voltage to the spark gap, the additive voltage being applied in electrical series with a line voltage across the spark gap to provide a total voltage across the spark which exceeds the line voltage.

2. An apparatus as claimed in claim 1, wherein the additive voltage is additive irrespective of polarity.

3. An apparatus as claimed in claim 1, wherein the voltage means is responsive to a trigger means.

4. An apparatus as claimed in claim 3, wherein the trigger means enables the voltage means at a predetermined line voltage.

5. An apparatus as claimed in claim 1, wherein the voltage means comprises a step-up transformer.

6. An apparatus as claimed in claim 1, wherein the voltage means serves to amplify a trigger signal, the amplified trigger signal being applied across the main electrodes of the spark gap to fire the spark gap.

7. An apparatus as claimed in claim 1, wherein the voltage means is provided in series with the spark gap.

8. An apparatus as claimed in claim 5, wherein the transformer has a toroidal winding.

9. An apparatus as claimed in claim 1, wherein the spark gap is a lightning arrestor.

10. A method of igniting a spark gap, the method comprising the steps of:

monitoring a voltage across a pair of line voltage rails for an overvoltage condition, at an overvoltage condition, providing an additive voltage in electrical series with the voltage across the main electrodes of the spark gap to provide a total voltage across the main electrodes of the spark gap which exceeds the voltage across the pair of line voltage rails at such time.

11. A method as claimed in claim 10, wherein the voltage at which an overvoltage condition is determined is less than a spark gap ignition voltage.

12. An apparatus as claimed in claim 2, wherein the voltage means is responsive to a trigger means.

13. A system adapted to initiate a firing of a spark gap in response to a transient or overvoltage condition in relation to a line voltage across a pair of voltage rails, the system comprising:

an arrestor including the spark gap coupled between the line voltage rails, the spark gap comprising a pair of main electrodes between which a main discharge current will flow between the line voltage rails as a result of the firing of the spark gap, and voltage means, operatively coupled to the spark gap, for selectively providing a firing voltage exceeding the line voltage across the pair of main electrodes upon an occurrence of a predefined overvoltage condition.

14. A system as claimed in claim 13, wherein the voltage means is operatively coupled in series with the spark gap between the line voltage rails.

15. A system adapted to initiate a firing of a spark gap in response to a transient or overvoltage condition in relation to a line voltage across a pair of voltage rails, the system comprising:

an arrestor including the spark gap coupled between the line voltage rails, voltage means, operatively coupled to the spark gap, for selectively providing a firing voltage exceeding the line voltage across the spark gap upon an occurrence of a predefined overvoltage condition, wherein the voltage means comprises a step-up transformer having a secondary winding connected in series with the spark gap.

16. A system as claimed in claim 15, wherein the transformer includes a primary winding energized in part by an overvoltage condition trigger element.

17. A system as claimed in claim 15, wherein the transformer has a toroidal winding.

18. A system as claimed in claim 17, wherein the secondary winding produces a relatively low inductance.

19. A system as claimed in claim 18, wherein the inductance does not exceed five microhenrys.

20. A method of igniting a spark gap operatively coupled between a pair of line voltage rails, the spark gap comprising a pair of main electrodes between which a main discharge current will flow between the line voltage rails as a result of the igniting of the spark gap, the method comprising the steps of:

detecting an occurrence of a voltage across the line voltage rails reaching a predefined overvoltage level; and upon detecting the occurrence, providing a firing voltage across the pair of main electrodes whereby the firing voltage exceeds the voltage across the line voltage rails at such time.

21. A method as claimed in claim 20, wherein the providing step includes a step of providing an additive voltage in series with the voltage otherwise present across the spark gap.

22. A system as claimed in claim 15, wherein the secondary winding produces a relatively low inductance.

23. A system as claimed in claim 22, wherein the inductance does not exceed five microhenrys.

* * * * *